United States Patent [19]

Hoyt et al.

[11] 4,078,128

[45] Mar. 7, 1978

[54] PROCESS FOR RENDERING ETHYLENE-VINYL ACETATE COPOLYMERS AGGLOMERATION-RESISTANT

[75] Inventors: John M. Hoyt; Karl Koch, both of Cincinnati; Joseph Fischer, Fairfield, all of Ohio

[73] Assignee: National Distillers and Chemical Corporation, New York, N.Y.

[21] Appl. No.: 721,744

[22] Filed: Sep. 9, 1976

Related U.S. Application Data

[63] Continuation of Ser. No. 585,421, Jun. 9, 1975, abandoned.

[51] Int. Cl.$^2$ .............................................. C08F 8/12
[52] U.S. Cl. .......................................... 526/10; 526/8; 526/331
[58] Field of Search ........................................ 526/10

[56] References Cited

U.S. PATENT DOCUMENTS

| | | | |
|---|---|---|---|
| 3,510,463 | 5/1970 | Bristol | 260/87.3 |
| 3,746,681 | 7/1973 | McClain | 260/29.6 PM |
| 3,780,004 | 12/1973 | Hoyt et al. | 260/87.3 |

Primary Examiner—Stanford M. Levin
Attorney, Agent, or Firm—Kenneth D. Tremain

[57] ABSTRACT

Tacky ethylene-vinyl acetate copolymers having about 35–95% by weight vinyl acetate content are rendered agglomeration-resistant by surface treatment thereof, before, during, or after forming into particles, with a basic liquid medium to hydrolyze not more than about 10% by weight of the vinyl acetate groups originally present in the copolymer, the hydrolysis being mainly confined to the surface of the particles without effecting any significant hydrolysis of the interior of the particles. Previously agglomerated particles of ethylene-vinyl acetate copolymers containing about 35–60% by weight of vinyl acetate are deagglomerated and rendered agglomeration-resistant by a similar treatment with a basic liquid medium. Non-pelletizable, tacky ethylene-vinyl acetate copolymers containing about 60–95% by weight of vinyl acetate are rendered agglomeration-resistant, and hence pelletizable, at the expense of the hydrolysis of not more than about 10% by weight of the vinyl acetate groups present, by similar treatment before or during particle formation.

2 Claims, No Drawings

PROCESS FOR RENDERING ETHYLENE-VINYL ACETATE COPOLYMERS AGGLOMERATION-RESISTANT

CROSS-REFERENCE TO RELATED APPLICATION

This application is a continuation of application Ser. No. 585,421, filed June 9, 1975, now abandoned.

BACKGROUND OF THE INVENTION

1. Field of the Invention

This invention relates to processes for rendering particles of tacky ethylene-vinyl acetate (hereinafter referred to as "EVA") copolymers agglomeration-resistant. The invention also relates to processes for deagglomerating agglomerated particles of EVA copolymers and rendering same agglomeration-resistant. It also relates to processes for forming particles of heretofore non-pelletizable ethylene-vinyl acetate copolymers in liquid media capable of rendering the particles agglomeration-resistant, and thereby, the copolymer pelletizable.

In accordance with the invention these results are obtained by the formation of at least a partially hydrolyzed surface on the ethylene-vinyl acetate particles treated.

2. Description of the Prior Art

It is well known in the art that various polymers, when in particulate form, tend to block and stick together during storage. For example, in U.S. Pat. No. 3,753,965, it is disclosed that ethylene-acrylic acid copolymers in the particulate form, especially those copolymers containing at least 10% by weight of acrylic acid, tend to block and stick together when warm and under the pressure generated by the weight of the copolymer in storage. This reference teaches that it is possible to render the particles less prone to blocking and sticking by treating them with a base until as little as 2.5% by weight of the carboxyl groups on the particle surfaces are converted to the corresponding salt groups.

It is also known that high molecular weight EVA copolymers which contain up to about 35% by weight of vinyl acetate (hereinafter referred to as "VA") readily lend themselves to pelletization by the methods used industrially for polyethylene resin, such as strand-chopping and pelletization in a fly-knife cutter bath. The term, "strand-chopping" as used herein means pelletization performed, for example, in a Cumberland size 6 pelletizer (Cumberland Engineering Co.). The term pelletization in a "fly-knife cutter bath" as used herein means pelletization of a resin as carried out, for example, in a Black-Clawson size No. 1 Pelletor.

However, those high molecular weight EVA polymers which contain substantially more than about 35% by weight of VA present serious problems in this regard. Copolymers containing about 35 to 60% by weight of VA, referred to herein as tacky, pelletizable copolymers, form pellets that not only stick together when warm or under the pressure generated by the weight of the resin in storage, as is observed in the case of the ethylene-acrylic acid copolymer, but also, at the higher Va contents within the range, readily stick together even at room temperature, soon after they are pelletized, to produce agglomerated bodies that eventually may aggregate further until they form a single, relatively coherent mass which takes on the shape of the container in which they are stored. However, pellet-boundaries are usually distinguishable in such agglomerates.

EVA copolymers which contain more than about 60 weight percent VA can not be pelletized by conventionl means because the pellets thereof immediately coalesce upon formation to produce a substantially homogeneous mass of resin in which pellet-boundaries can scarcely be distinguished; such EVA copolymers are referred to herein as tacky, non-pelletizable EVA copolymers.

It will be recognized by those skilled in the art that the aforesaid composition ranges may be somewhat arbitrary, and will depend to some degree upon such factors as the molecular weight and structure of the copolymers as well as on the content of residual volatile materials (VA monomer, etc.) and on the conditions of storage of already pelletized copolymers, such as ambient temperature and pressure due to their weight.

It is an object of this invention to overcome these and other problems by providing processes for rendering such EVA copolymers agglomeration-resistant. In particular it is an object of this invention to provide processes for rendering tacky, pelletizable EVA copolymers agglomeration-resistant before, during, or after the mechanical operations whereby the copolymers are converted into the pellet or particulate form. Additionally, when the tacky, pelletizable copolymers in the particulate or pelletized form have already agglomerated, it is a further object of this invention to provide a process in which such agglomerates are deagglomerated to release the original particles or pellets in the agglomeration-resistant form.

It is a further object of this invention to provide processes for rendering tacky, heretofore non-pelletizable EVA copolymers agglomeration-resistant before or during mechanical operations thereon, whereby such copolymers may be converted to the particulate or pellet form, to thereby provide the heretofore unpelletizable EVA copolymer in an agglomeration-resistant, and hence pelletized or particulate form.

Complete and partial alcoholysis of EVA copolymers in the particulate form is well known in the art (U.S. Pat. No. 3,510,463 and British patent specification No. 1,095,204). Although it is disclosed (British patent specification No. 1,095,204) that the reaction can be confined to the surface of the particulate or shaped form of the copolymer to impart antistatic properties or improved receptivity to printing inks, nevertheless it has not been shown in these teachings that such surface treatment of the particles with a base will render them more resistat to blocking and sticking together.

According to U.S. Pat. No. 3,753,965, the improved blocking- and sticking-resistance observed for base-treated ethylene-acrylic acid copolymer particles is caused by the protective action of carboxylic acid salt groups formed on the particle surfaces by neutralization of the surface carboxylic acid groups. However, it would not be expected that EVA copolymer particles would be rendered resistant to blocking and sticking as a result of a similar base treatment, because the methyl acetate or sodium acetate formed by such treatment would be substantially washed off the surface of the particles, either by the basic liquid media employed or by water used later to wash off any excess base.

In the EVA pellet alcoholysis processes disclosed in the above-mentioned references, it is taught that the direct alcoholysis of EVA is best effected with EVA copolymers which contain less than about 40% by weight of VA. Thus, according to U.S. Pat. No. 3,510,463, if the copolymer pellets contain more than about 40% by weight of VA, they will dissolve in the liquid alcoholysis media disclosed, e.g., mixtures of methanol and toluene or methylene chloride. Therefore, pellets of those EVA copolymers which are of principal interest in the present invention, i.e., those which contain more than about 35% by weight of VA, could not in most cases be surface-treated with a base by the process of U.S. Pat. No. 3,510,463 because they would dissolve. Moreover, even though British patent specification No. 1,095,204 broadly discloses EVA copolymers containing up to 50% by weight of VA as being operable in a pellet-alcoholysis process which is practically identical to that of U.S. Pat. No. 3,510,463, the preferred range disclosed therein is 5-25% by weight of VA.

It is further known (Japanese Pat. No. 70 12,239; Chem. Abstrs. 73; 88645e) that the alcoholysis of EVA film in methanolic sodium methoxide yields a blocking-resistant, fully hydrolyzed film; but this process is apparently very slow, since a reaction time of 1 hour at 20° C is disclosed. Moreover, and more importantly, complete alcoholysis of the film is contemplated. As will appear hereinafter, this differs markedly from the present invention.

In addition, U.S. Pat. Nos. 2,386,347 and 2,339,653 disclose that EVA copolymers containing at least 40% by weight of VA are partially hydrolyzed (or alcoholyzed) by treatment with an alkali to yield a material having wet strength and low temperature toughness. In the first of these patents the degree of partial hydrolysis contemplated is a minimum of 80%, while in the second patent, the partial hydrolysis contemplated is from 10 to 80%. In either case, a substantial degree of hydrolysis of the EVA copolymer is contemplated. As will appear below, the present invention contemplates a very minor degree of hydrolysis of the EVA copolymer.

In contrast to these prior art processes, and as will be discussed in more detail below, the processes of this invention contemplate extremely rapid surface treatments of EVA copolymers to effect the hydrolysis of the VA groups on or near the surface of the particles without any significant hydryolysis of the interior. Thus, according to the processes of this invention, the conditions of EVA stock temperature, the composition and temperature of the treating medium, and the concentration of the alkali in the medium are controlled so that sufficient agglomeration-resistance is imparted in the shortest possible contact time (a few seconds to a few minutes). Thus the hydrolysis will proceed very rapidly on the surface of the EVA copolymer and then essentially stop, so as to prevent significant hydrolysis from occurring within the pellets.

As has already been pointed out, the known processes are not generally useful for the surface treatment of EVA copolymers containing more than about 35% by weight of VA since it is desirable that the EVA copolymer not dissolve, but more importantly that the surface treatment be accomplished rapidly without substantial overall hydrolysis.

Moreover, there is no teaching in any of the heretofore known art that the treatment of already agglomerated pellets with a base can reverse the agglomeration process, so that the individual pellets are substantially regenerated from the agglomerates, and are at the same time additionally made sufficiently more resistant to blocking and sticking to prevent subsequent reagglomeration either at room temperature or at the temperatures and pressures encountered in normal use. In fact, it would logically be expected by those skilled in the art that such treatment of pellet-agglomerates with a base would merely render the agglomerates themselves resistant to sticking and blocking. The regeneration of the original, individual pellets from the pellet agglomerates is quite unexpected and surprising.

SUMMARY OF THE INVENTION

The present invention provides processes for producing agglomeration-resistant particles of tacky EVA copolymers. In several embodiments, the invention is directed to the production of such agglomeration-resistant particles by treating the copolymer before, during, or after the mechanical operations in which it is converted to the pellet or particulate form and, in an alternative embodiment, the invention provides a process for producing such agglomeration-resistant particles from previously agglomerated EVA particles.

In its broadest aspect the invention comprises treating an EVA copolymer, containing 35% by weight or more of VA, in the solid form with a liquid medium containing a base to hydrolyze no more than about 10%, preferably no more than about 5%, by weight of the VA originally present and thereby forming agglomeration-resistant particles of EVA. When the tacky EVA contains about 35 to 60% by weight and is thus a copolymer, it may be treated in the form of a continuously formed strand before cutting the latter into short treated segments. It may be treated as already formed particles or pellets, before agglomeration can occur, and the copolymer may be treated during or simultaneously with the mechanical process of pelletization, as in fly-knife cutter bath containing the treating medium, which serves the dual function of coolant and hydrolysis medium. In addition the copolymer may be treated in the form of agglomerates of several particles thereof. The EVA particles are rendered agglomeration-resistant by this treatment, and when agglomerates are treated according to the invention, substantially deagglomerated particles are regenerated and are thereby rendered agglomeration-resistant.

When the tacky EVA copolymer contains more than about 60% by weight of VA, it may alternatively be treated as a continuously-formed strand before being cut into short segments or it may be treated during or simultaneously with the mechanical process whereby it is converted into pellets, as in a fly-knife cutter bath, wherein the treating medium will again both provide cooling to the resin being pelletized and at the same time cause the surface hydrolysis of the pellets produced. While EVA resins containing more than about 60% by weight of VA were previously believed to be non-pelletizable, the process hereof renders such resins both agglomeration-resistant and, as a consequence, pelletizable.

The ethylene-vinyl acetate copolymers which may be treated in accordance with this invention are normally solids at room temperature and range in number-average molecular weight from about 10,000 to 200,000. They may additionally contain minor amounts, i.e., up to about 10% by weight of the total copolymer, of a third monomer, which may, for example, be a vinyl ester of a carboxylic acid having 3-12 carbon atoms, or a monomer selected from the group comprising carbon monoxide, sulfur dioxide, methyl acrylate, n-butyl acrylate, di-n-butyl maleate, diethyl itaconate, and the like.

The EVA copolymers used in the process of this invention generally contain from about 35% to about 95% by weight of VA. When a third comonomer is present it will, as pointed out above, not ordinarily exceed about 10% by weight of the total weight of the terpolymer, the remainder being composed of ethylene and VA in the proportions given above for the binary copolymer. The preferred copolymers will vary in composition within this broad range in accordance with the particular embodiment of the invention, as discussed below.

The EVA copolymer may be prepared by any method known in the art, i.e., by copolymerization in bulk, in solution, or in emulsion or dispersion. However, the processes of the invention are primarily directed to EVA copolymers prepared by the high pressure bulk process originally developed for the manufacture of polyethylene and are most readily adapted to this process.

The basic liquid media used in the invention are solutions of from about 3–60% by weight of a base in a liquid which does not dissolve or extensively swell the EVA copolymers. The liquid medium is ordinarily a mixture of water and from about 1 to 99% by volume of water-miscible lower alkanol (e.g., the $C_1$–$C_4$ alkanols), although in some embodiments use may be made of media which comprise water alone or, less commonly a water-miscible lower alkanol alone. Examples of the water-miscible lower alkanols which may be thus employed include methanola, ethanol, n-propanol, 2-propanol and 2-methyl-2-propanol. The preferred alcohol is methanol.

Among the bases which may be used in accordance with the invention are included the alkali metal hydroxides, for example, lithium hydroxide, sodium hydroxide and potassium hydroxide, and the alkali metal alkoxides, e.g., those in which the alkoxide moiety has from one to four carbon atoms, such as sodium methoxide, sodium ethoxide and potassium isopropoxide. Because of their ease of hydrolysis, alkali metal alkoxides are generally restricted to use in media whose liquid component is substantially a pure lower alkanol. The alkali metal hydroxides are more versatile since they may be used in media containing both an alkanol and water, or even in water alone, and therefore alkali metal hydroxides are preferred. Sodium hydroxide is the preferred alkali metal hydroxide.

Although it is within the purview of this invention to employ treating media incorporating the above-noted materials in any desired proportions, and by judicious choice of method of treatment, alkali concentration in the medium, medium temperature, and EVA stock temperature, to impart sufficient agglomeration-resistance to the EVA copolymer in a short contact period, five distinct media have proven to be most useful in the several embodiments of this invention. The composition ranges of these five selected treatment media, and the range of alkali concentration therein, both broad and preferred, are shown in Table I.

TABLE I

| Medium No. | Alkali % by Weight (2) | | Alcohol % by Volume (1) | |
|---|---|---|---|---|
| | Broad | Preferred | Broad | Preferred |
| I | 3–25 | 5–15 | 70–100 | 90–99 |
| IA (3) | 3–25 | 10–20 | 95–100 | 99–100 |
| II | 30–60 | 35–50 | 30–70 | 40–55 |
| III | 40–60 | 45–55 | 1–30 | 2–10 |

TABLE I-continued

| Medium No. | Alkali % by Weight (2) | | Alcohol % by Volume (1) | |
|---|---|---|---|---|
| | Broad | Preferred | Broad | Preferred |
| IV | 12–60 | 15–45 | None | None |

(1) The remainder of the liquid mixture (before adding alkali) is water.
(2) The alkali added is an alkali metal hydroxide unless otherwise specified.
(3) The alkali added is an alkali metal alkoxide only.

In Table I the term "alkali" normally refers to an alkali metal hydroxide. Alkali metal alkoxides, however, may be used in the type IA medium disclosed in Table I, wherein the alkanol component will be substantially a pure alkanol. Alcohol-rich media such as I, IA and II may be employed in all the embodiments of this invention, described more fully hereinafter. The substantially aqueous media III and IV are mainly useful in the first and third embodiments of the invention.

Although the processes of this invention may be conducted in air, it is more often preferred that an inert atmosphere be employed, e.g., nitrogen, helium, argon; and although the processes of the invention are ordinarily carried out at atmospheric pressure it is also possible to operate at pressures above atmospheric pressure when the temperatures of the treating media are above the normal boiling point thereof. In such cases the pressure need only be an amount sufficient to maintain the treatment media in the liquid state.

PREFERRED EMBODIMENTS OF THE INVENTION

The invention will now be described in greater detail and, in particular, with reference to the several embodiments of the invention.

1. First Embodiment — Continuous Strand Treatment

In carrying out this, the most preferred embodiment of the invention, the EVA copolymer is continuously fed into an extruder, from whence it exits as a strand. The strand is then passed, in order, through a basic liquid medium contained in a suitable trough or tank, a water bath optionally containing a weak acid to neutralize or remove excess base, and finally through a chopper, in which the treated strand is pelletized by cutting it into sections. The length of the cut sections should be sufficient to insure that the agglomerating effect of the untreated cut ends of the section is negligible. If desired, the pellets made by cutting the treated strand may by subjected to a further treatment with base, as disclosed in the second embodiment of this invention, described below, to render the cut ends resistant to agglomeration as well as to impart even more agglomeration resistance to the already treated surfaces. When this further treatment with base is used, it is feasible to make the length of the cut strand section considerbly smaller than would otherwise be the case. Thus, smaller pellets are provided, which have obviously been treated on all surfaces. The pellets are then dried by conventional means.

In this embodiment of the invention, the EVA copolymer will broadly contain 35 to 95%, preferably between about 40 and 75% VA; if the alcohol-rich media I, IA or II are used, the EVA stock temperature will broadly be between 50°–150° C, preferably between 65° and 135° C; the temperature of the medium will be between 25°–100° C, preferably between 40° and 60° C; and although the treatment period may range from as little as 10 seconds to as long as 2400 seconds, it is preferably held between 60 and 600 seconds.

When the substantially aqueous media III or IV are used, a higher EVA stock temperature will be required, 100°–250° C broadly, 130°–180° C and 150°–200° C, respectively, preferred; additionally, the temperature of the medium must also be higher, 60° to 130° C broadly and 80°–110° C preferred for medium III; and 40°–170° C broadly, 50°–140° C preferred for medium IV; and the treatment will be held to a contact period of 1 to 2400 seconds broadly, and of 60–600 seconds preferred. Thus in this embodiment of the invention, both pelletizable (less than about 60% by weight of VA) EVA copolymers and non-pelletizable (more than 60% by weight) EVA copolymers may be rendered agglomeration-resistant. Moreover, as a consequence of the treatment, the heretofore non-pelletizable EVA copolymers (>60% VA) may also be made pelletizable.

The diameter of the copolymer strand will be at least enough to insure sufficient mechanical strength during the operation, and will vary broadly from about 1/16 inch to 1 inch, with diameters of about ⅛ to ⅜ of an inch being preferred. The basic liquid treating medium may be maintained in a static condition, but it is preferred that it be agitated during the treatment process.

The water wash bath through which the treated strand is then passed is kept at a temperature of about 10° to 90° C, preferably 20° to 50° C. One such bath may be used alone, or two or more may be employed in series. The water bath (or baths) may optionally contain about 1–10% by weight of a water-soluble weak acid. Acetic acid, in a concentration of about 3–7% by weight is the preferred acid. Since the water wash bath gradually becomes contaminated with alcohol, base, acetate ester and sodium acetate, it may be processed to remove these materials, if desired, or periodically replenished with fresh water.

The treated and washed strands then pass through a chopper in which they are cut into short sections which range in length from ⅛ inch to about 2 inches, preferably about ¼ inch to about 1 inch. As mentioned above, the treated, chopped strand sections should be long enough so that the blocking and sticking caused by the untreated cut ends is not sufficient to cause extensive agglomeration. Alternatively, the cut sections may be briefly treated by contact with additional basic liquid medium as described below in connection with the second embodiment of the invention. In this latter instance, the preferred length of the chopped sections is from about ⅛ inch to about ½ inch.

2. Second Embodiment — Treatment of Preformed Particles

In the second embodiment of the invention, the EVA copolymer is first converted to the particulate form, e.g., it is pelletized in a conventional manner in a fly-knife cutter pelletizing medium, or by passage as an extruded strand through a strand-chopper, and the thus produced pellets are then, in a subsequent step, immediately contacted with a liquid medium containing a base. It is also within the scope of this embodiment to treat the EVA copolymer in the form of spherical particles with a number of average diameter of about 10 microns prepared by a method known in the art (U.S. Pat. No. 3,746,681).

The EVA copolymers used in this embodiment contain an amount of VA that is comparatively low, i.e., an amount which is insufficient to cause coalescence immediately after pelletization. The pellets are treated in the basic liquid medium in the form of substantially individual pellets, under conditions which are appropriate for imparting the desired amount of agglomeration resistance to the pellets. In the event, however, that under certain circumstances agglomeration proves to be unavoidable, the agglomerates may be deagglomerated by the treatment described in the fourth embodiment of this invention, to afford the original pellets in the agglomeration-resistance form.

Contacting of the individual pellets with the basic liquid medium may be accomplished in a number of ways. In a simple form of this embodiment the individual pellets are dispersed in the basic liquid medium in a suitable stirred vesse, separated therefrom by decantation, washed with water, optionally containing a weak acid such as acetic acid, and dried. In another variant of this embodiment the pellets are held in a suitable vessel in a relatively stationary or confined condition and are thereafter rapidly contacted with a moving current of the basic liquid medium, which serves both to impart moderate agitation to the pellets as well as to render them agglomeration-resistant. In still another variant the pellets contained in a screen or wire basket may be dipped into the base liquid medium for a sufficient time, then dipped in water to accomplish washing, and dried.

Alternatively, the pellets may be contacted with the basic liquid medium by passing them, on a suitable conveyor, through a spray-chamber where the basic liquid is sprayed onto the pellets. The use of air-knives during the spraying operation is desirable in order to achieve uniform spraying. Thereafter, the treated pellets are transported by the conveyor through a second spray chamber where they are washed by spraying with water, optionally containing a weak acid such as acetic acid. The treated and washed pellets are then dried by conventional means.

In this embodiment, the preferred EVA copolymer will broadly contain from about 35 to 60% by weight, preferably about 38 to 55% by weight of VA and, as mentioned above, the copolymer is pelletized in a fly-knife cutter bath, or by strand-chopping in a conventional manner after which the pellets are immediately contacted with basic liquid medium before significant agglomeration can occur. The pellets may be cubical, spherical or ovoid in shape or in the form of chopped-strand sections, and have a diameter or longest dimension of about 1/100 inch to about one inch; a dimension of 1/10 to ⅜ inch is preferred. The EVA stock temperature, i.e., temperature of the pellets themselves, ranges from about 20° to about 60° C, and is preferably between about 25° and 40° C.

The basic liquid medium, in this embodiment, may be either the aforesaid media I, IA or II. Medium I is preferred. If medium I is used, the pellets are contacted with the basic liquid medium for 10–2400 seconds, preferably 30–600 seconds at a temperature of about 27° to 100° C, preferably 40° to 60° C. When medium IA is employed, however, the contact time may range from as low as 1 second to as high as 2400 seconds, preferably from about 10 seconds to 600 seconds; and the medium temperature will vary from about 10° to about 100° C, preferably from 25° to 60° C; and in the event that medium II is used, the medium temperature is broadly 35° to 100° C, preferably 40°–60° C, and the contact time is 60 to 2400 seconds, preferably from 120 to 600 seconds.

After the pellets have been surface-treated they are washed with water, optionally containing 1–10%, preferably 3–8%, by weight of a weak organic acid such as acetic acid. The pellets may thereafter be washed one or more times with water alone, and are then dried by conventional means.

3. Third Embodiment — Simultaneous Pelletization and Treatment

In the third embodiment of the invention, the EVA copolymer is pelletized in the fly-knife cutter bath; however, the water normally used as a coolant in pelletizing is replaced by a basic liquid medium. Thus in this embodiment, the copolymer is simultaneously pelletized and surface-treated to render it agglomeration-resistant.

The EVA copolymer used in this embodiment may be a pelletizable EVA copolymer, i.e., one that can be conveniently formed into pellets capable of retaining their shape for considerable time, even though serious agglomeration may eventually occur, or it may be a non-pelletizable EVA resin, one whose pellets coalesce almost immediately after formation.

In this embodiment the EVA copolymer passes, in the molten state, directly from its synthesis into a fly-knife cutter whose bath contains the basic liquid medium. By appropriate control of the EVA stock temperature, the selection of the basic liquid medium, the concentration of the base therein, and the temperature and circulation velocity thereof, it is possible to effect the simultaneous pelletization and surface-treatment of the pellets produced, so that the desired agglomeration resistance is imparted to the pellets, while limiting the overall degree of hydrolysis to no more than about 10%, preferably no more than about 5%, by weight of the VA content of the original EVA copolymer. After removal from the basic liquid medium, the treated pellets are washed with water, optionally containing a sufficient amount of a weak acid to neutralize and remove any base, and are then dried by conventional means.

In this embodiment, the EVA copolymers broadly contain about 35% to about 95%, preferably about 38 to 70%, by weight of VA and, as mentioned above, the copolymer is passed, in the molten state, directly from its synthesis (but after appropriate degassing to remove unreacted comonomers) into a fly-knife cutter bath containing the basic liquid medium, which serves the dual purpose of coolant and surface-treatment medium. Although the medium may be kept static during pelletization, it is preferred that it be fed continuously to the fly-knife cutter bath and discharged therefrom; it is especially preferred, for economic reasons, that the basic liquid medium be circulated by means of a suitale pump. The pellets may be cubical, cylindrical or ovoid in shape and will have a longer dimension from about 1/100 of an inch to 1 inch; a dimension of 1/10 to ⅜ of an inch is preferred.

All of the basic liquid media disclosed above in Table I may be used in this embodiment. Although the alcohol-rich media I, IA and II are particularly efficacious in imparting agglomeration resistance during pelletization in this embodiment, they may present a certain safety hazard because of alcohol-flammability, and as a consequence the substantially aqueous media III and IV are often to be preferred.

The EVA stock temperature, if medium I, IA or II is employed in the bath, will broadly vary from about 50° to 180° C, preferably from about 65° to 150° C, and the bath temperature will range from as low as 5° to as high as 60° C, with a temperature of 18° to 55° C being preferred. However, when medium III or medium IV is employed in the bath, the EVA stock temperature will be higher, and broadly vary from 50° to 250° C; for medium III an EVA stock temperature of 100°-180° C is preferred and the bath temperature will be 20°-130° C, broadly, and 50°-90° C preferred; whereas, if the bath contains medium IV, the EVA stock temperature will preferably be held between about 150° and 200° C, and the bath itself will broadly range from about 40° to 150° C, with a temperature of about 40° to 120° C being preferred. When all the above conditions are met, the contact time required to impart agglomeration resistance will range from 1 to 1500 seconds, but a contact time of 5 to 300 seconds is usually efficient and is preferred.

After the pelletized, surface-treated EVA resin leaves the fly-knife cutter bath it is washed with water optionally containing a sufficient amount of a weak acid to neutralize and remove any excess alkali and salts that the pellets may contain. Thereafter, the pellets are handled in the conventional manner, the difference, of course, being that they have now been rendered free-flowing.

As pointed out above, when EVA resins broadly containing between about 60% and about 95% by weight of VA are treated by the process of this embodiment, these heretofore unpelletizable resins acquire agglomeration resistance in the pellet form and thereby some pelletizable. However, the agglomeration resistance thus imparted to the particles of EVA copolymers containing more than about 60% by weight of VA in this embodiment by a medium incorporating a relatively large proportion of alcohol, such as medium I, may be of a relatively temporary nature because, upon drying in vacuum, tacky material may exude from inside the particles to the outside, treated surface, where it can lead to reagglomeration. Nevertheless, such temporary agglomeration resistance, which usually persists for a matter of hours, permits particles of these EVA copolymers to be blended with other lots of the same or different resins, to be transferred, and to be subjected to subsequent processing and chemical reactions (e.g., further alcoholysis), provided the time required in all these operations is less than the time required for exudation of the tacky material from within the particle and the onset of serious amounts of agglomeration.

4. Fourth Embodiment — Deagglomeration of Pellets

This embodiment of the invention is directed to a process for treating already agglomerated particles of EVA copolymer to deagglomerate them and at the same time render the thusly deagglomerated particles agglomeration-resistant. Such agglomerates normally form when pellets made from an EVA copolymer containing more than about 40% by weight of VA are allowed to stand in contact with each other for any appreciable time at ambient temperature, or at elevated temperatures and under the pressure generated by the weight of the pellets themselves.

In this embodiment of the invention, pelletized EVA copolymer containing broadly from about 35% to about 60% by weight of VA, preferably from about 40% to about 55% by weight of VA, in the form of agglomerated masses is heated with a basic liquid medium to accomplish both deagglomeration and surface-treatment of the individual particles contained in the agglomerates. The process is preferably carried out under agitation, since agitation is usually necessary to accomplish deagglomeration. In fact, intensive agitation, of the type exemplified by an ordinary household blender, is sometimes required to deagglomerate the more severely agglomerated pelletized resins, particularly those having a VA content relatively high in the preferred range. The particles comprising the agglomerates will be of the same size and shape as those disclosed in the second embodiment of this invention. The deagglomeration of agglomerated spherical particles prepared by the method of U.S. Pat. No. 3,746,681 is also within the scope of this embodiment.

The basic liquid medium used in this embodiment may either be medium I, IA or medium II. With all of these media, the EVA stock temperature, i.e., the temperature of the pellet agglomerates, will broadly vary from about 20° to about 60° c, preferably from about 25° to 40° C. The medium temperature will be maintained between about 10° and about 100° C, preferably between 35° and 60° C. The contact time will be between about 5 and about 3600 seconds, preferably between about 300 and about 1200 seconds. It may be necessary to break up the large agglomerated masses of pellets into smaller agglomerates generally ½–6 inches, preferably, 1–3 inches in diameter, by mechanical means such as cutting or tearing, so that the smaller agglomerates may then be conveniently fed to the reaction vessel in which they are to be treated, preferably, under agitation with the basic liquid medium.

Deagglomeration in the basic liquid medium generally occurs rapidly and the individual EVA pellets that are released are then allowed to remain in further contact with the basic liquid medium until they are rendered sufficiently resistant to blocking, sticking, and reagglomeration.

After the treatment of the pellets is completed, the individual deagglomerated surface-treated pellets are washed with water, optionally containing a weak acid such as acetic acid to neutralize and remove any excess base, and then dried. The pellets may then be classified, if desired, to remove any minor fraction of the pellets which has failed to deagglomerate.

By way of summary, the broad and preferred conditions utilized in the several preferred embodiments described herein-above are set out in the following table IA. As indicated hereinabove, and as indicated in the table, regulation of a number or process variables, e.g., ethylene-vinyl acetate stock temperature, medium composition, nature of base, base concentration, medium temperature, and contact time, is necessary to provide optimum agglomeration resistance in accordance with the present invention. Further, the specific parameters utilized to effect agglomeration resistance will vary depending upon the particular embodiment of the invention selected, i.e., whether the ethylene-vinyl acetate copolymer is treated in continuous strand form (embodiment I), is in the form of preformed particles, e.g., pellets (embodiment II), is subjected to simultaneous treatment during pelletization (embodiment III), or is in the form of previously agglomerated particles (embodiment IV). Accordingly, it should be understood that the various process parameters specified are intended as illustrative rather than limiting of the present invention as defined in its generic aspects in the claims appended hereto.

TABLE IA

OPERATING CONDITIONS

| | | EVA Resin Wt.% VA | | Treating Medium | EVA Stock Temp., ° C | | Medium Temp., ° C | | Treatment period Sec. | |
|---|---|---|---|---|---|---|---|---|---|---|
| No. | Embodiment Name | Broad | Preferred | No. | Broad | Preferred | Broad | Preferred | Broad | Preferred |
| 1 | Continuous strand-treatment | 35–95 | 40–75 | I | 50–150 | 65–135 | 25–100 | 40–60 | 10–2400 | 60–600 |
| | | 35–95 | 40–75 | IA | 50–150 | 65–135 | 25–100 | 40–60 | 10–2400 | 60–600 |
| | | 35–95 | 40–75 | II | 50–150 | 65–135 | 25–100 | 40–60 | 10–2400 | 60–600 |
| | | 35–95 | 40–75 | III | 100–250 | 130–180 | 60–130 | 80–110 | 1–2400 | 60–600 |
| | | 35–95 | 40–75 | IV | 100–250 | 150–200 | 40–170 | 50–140 | 1–2400 | 60–600 |
| 2 | Treatment of preformed particles | 35–60 | 38–55 | I | 20–60 | 25–40 | 27–100 | 40–60 | 10–2400 | 30–600 |
| | | 35–60 | 38–55 | IA | 20–60 | 25–50 | 10–100 | 25–60 | 1–2400 | 10–600 |
| | | 35–60 | 38–55 | II | 20–60 | 25–40 | 35–100 | 40–60 | 60–2400 | 120–600 |
| 3 | Simultaneous pelletization and treatment. Pelletizable resins | 35–95 | 38–70 | I | 50–180 | 65–150 | 5–60 | 18–55 | 1–1500 | 5–300 |
| | | 35–95 | 38–70 | IA | 50–180 | 65–150 | 5–60 | 18–55 | 1–1500 | 5–300 |
| | | 35–95 | 38–70 | II | 50–180 | 65–150 | 5–60 | 18–55 | 1–1500 | 5–300 |
| | | 35–95 | 38–70 | III | 50–250 | 100–180 | 20–130 | 50–90 | 1–1500 | 5–300 |
| | | 35–95 | 38–70 | IV | 50–250 | 150–200 | 40–150 | 40–120 | 1–1500 | 5–300 |
| 4 | Deagglomeration of pellets | 35–60 | 40–55 | I | 20–60 | 25–40 | 10–100 | 35–60 | 5–3600 | 300–1200 |
| | | 35–60 | 40–55 | IA | 20–60 | 25–40 | 10–100 | 35–60 | 5–3600 | 300–1200 |
| | | 35–60 | 40–55 | II | 20–60 | 25–40 | 10–100 | 35–60 | 5–3600 | 300–1200 |

As pointed out above in connection with the description of the prior art, it is believed to be unlikely that the improved resistance to blocking, sticking and agglomeration imparted to the EVA copolymer pellets of this invention is caused by the formation of carboxylic acid salt groups on the pellet surface, as is thought to be the case when ethylene-acrylic acid copolymers are treated with base because in the processes of the present invention, any sodium acetate produced would be washed off the pellets by the basic liquid medium, or by subsequent washing with water, and could not make a significant contribution to the observed reduction in the tendency of the pellets to block and stick together. Rather, it is conceivable that the improved resistance to agglomeration imparted to the EVA copolymers of this invention may, in part, be due to the increased hardness associated with the hydrolyzed EVA copolymers as compared to the original, untreated copolymers. However, other factors may also (or alternatively) be involved; accordingly, it should be understood that this invention is not limited to this possible mechanism. Whatever the mechanism, it has been found possible, in accordance with the present invention, to impart improved resistance to agglomeration to a wide variety of tacky EVA copylmers. Utilizing this invention surface hydrolysis proceeds very rapidly, and at the same time further reaction within the interior of the pellets is minimized, so that no excessive overall hydrolysis occurs, i.e., no more than about 10% by weight of the total amount of VA units contained in the original EVA copolymer.

Although the first, second and fourth embodiments of this invention envision the substantial immersion of copolymer strands, individual particles, or agglomerates thereof in a basic liquid medium, such contact may also be achieved by other means, as by spraying the basic liquid medium onto the said strands, particles or particle agglomerates.

In the illustrative examples that follow, the EVA copolymers are deemed to have been made agglomeration-resistant on the basis of two criteria:

1. the treated particles are not agglomerated and are free-flowing at room temperature;
2. the treated particles remain substantially free-flowing after compression and under a load of 1-2 psi at an elevated temperature, usually 120° F (49° C) and in some cases 140° F (60° C).

Treated particles that meet criterion (1) do not always meet criterion (2); however, the agglomeration-resistance acquired when criterion (1) is met may be sufficient to permit the resin to be handled as particles at room temperature in such useful operations as transferring in an air stream, blending with other lots of the same or different resins, and feeding to subsequent processing steps.

Treated particles that meet both criteria (1) and (2) will not only be capable of being handled in the particulate form in the aforesaid operations, but they will additionally resist agglomeration at the elevated temperatures (120° F and above) encountered in shipping and storage during hot weather.

EXAMPLES

The following examples are given to illustrate the several disclosed embodiments of the invention without, however, limiting the invention thereto.

In the first, and most preferred embodiment, the EVA resin containing 35-95%, preferably 40-75%, by weight of VA is extruded into a strand which is continuously passed, in turn, through the basic liquid medium, a water wash bath, an air-knife for drying, and thence into a chopper for pelletization.

This embodiment is illustrated in Examples 1 and 2, wherein the medium employed is the above-described medium I.

EXAMPLE 1

The EVA copolymer employed in this experiment had a vinyl acetate content of 40.5% by weight as determined by saponification, and a melt flow rate of 1.99 g/10 min. determined according to ASTM Method D-1238-65, Condition B.

The resin was extruded through a specially fabricated die of circular cross-section and ¼ inch in diameter. The strand was led, by means of a suitable pulley arrangement, beneath the surface of about 5 gallons of a basic liquid medium of the type described as medium I in Table I comprising a solution of 0.063 g/ml of anhydrous sodium hydroxide in 95% ethyl alcohol, contained in a stainless steel trough about 6 inches wide, 4 inches deep, and 10 feet long. The trough was covered with a Plexiglas cover having small openings at each end to permit the strand to pass in and out. The bath contained a metal coil through which cold water could be circulated to control the temperature. The only heat supplied to the bath was the sensible heat of the entering strand. The temperature of the bath was checked by means of a thermometer, and ranged from 22° C up to 45° C during the run. The contact time in various runs was either 14 or 25 seconds as shown in Table II. Movement of the strand provided the only agitation in the system.

After leaving the base treatment bath the strand entered a similar bath containing about 5 gallons of flowing cold water, after which the strand was drawn through an "air-knife" for drying and finally into a Cumberland cutter in which the strand was chopped into sections. The chopped strand samples prepared as set forth in Table II were collected in separate bags. There was no visible color build-up on any of the treated pellet samples.

As indicated by Table II the untreated pellets of the original (Control) resin fused together under the conditions of the compaction test (49° C, 24 hours, 1 psi). All the samples of treated pellets, however, had better resistance to agglomeration than the control, as evidenced by the fact the individual pellets could be separated with a greater or lesser degree of difficulty, but none of the pellet samples were considered to be free-flowing after the compaction test.

As was expected, pellet agglomeration due to the effect of untreated cut ends was observed (Sample 1). Longer contact time (25 seconds) and higher treatment temperature appeared to generally impart better agglomeration resistance, although the results of this example are not entirely consistent, i.e., separable pellets were observed at both the lower and higher temperatures (Samples 1 and 6), whereas inferior results were obtained at an intermediate temperature (Sample 5). In no case was the degree of hydrolysis appreciable. The vinyl acetate content of the treated samples was in no case lower than 39.3% by weight, corresponding to a loss of about 3% by weight of the total vinyl acetate content of the original resin. There was no appreciable build-up of sodium salts on the pellets as a result of the treatment (30 ppm or less, as sodium).

Although the chopped, treated strands of this example were not free-flowing after compaction at 49° C for 24 hours under a load of 1 psi, they were free-flowing at room temperature prior to the compaction test.

TABLE II

CONTINUOUS SURFACE TREATMENT OF ETHYLENE-VINYL ACETATE COPOLYMER STRAND

Treatment Bath: 95% Ethanol
Base: NaOH; 0.063 g/cc (Initial); 0.073 g/cc (Final)

| Sample No. | Extruder Stock Temp., ° C. | Surface Treatment Conditions | | | Pellet Size, In. | | MFR (1) | Properties of Chopped, Treated Strand Samples | | |
|---|---|---|---|---|---|---|---|---|---|---|
| | | Bath Temp. ° C | | Contact Time Sec. | Length | Diam. | | Vinyl Acetate Content, Wt. % (2) | Sodium Ion, ppm (2,3) | Behavior on Compaction (4) |
| | | In | Out | | | | | | | |
| Untreated (Control) | — | — | — | — | Spherical | (5) | 1.99 | 40.5 | 10 | Pellets fused together; boundaries invisible in center of sample. |
| 1 | 105 | 22.2 | 26.1 | 25 | 3/16-1/4 | 0.19 | 1.95 | 39.8 | 10 | Pellets stuck together mostly on ends; |
| 2 | 121 | 23.9 | 29.4 | 14 | 3/16-1/2 | 0.16-0.21 (6) | 1.97 | 39.9 | 20 | Single pellets separable with slight difficulty. Pellets stuck tightly together. |
| 3 | 113 | 27.7 | 28.9 | 14 | — | 0.12 | 1.83 | 40.4 | 10 | Pellets separable with difficulty |

TABLE II-continued
CONTINUOUS SURFACE TREATMENT OF ETHYLENE-VINYL ACETATE COPOLYMER STRAND Treatment Bath: 95% Ethanol
Base: NaOH; 0.063 g/cc (Initial); 0.073 g/cc (Final)

| Sample No. | Extruder Stock Temp., °C | Surface Treatment Conditions Bath Temp. °C In | Surface Treatment Conditions Bath Temp. °C Out | Contact Time Sec. | Pellet Size, In. Length | Pellet Size, In. Diam. | MFR (1) | Vinyl Acetate Content, Wt. % (2) | Sodium Ion, ppm (2,3) | Behavior on Compaction (4) |
|---|---|---|---|---|---|---|---|---|---|---|
| 4 | 116 | 33.9 | 37.8 | 14 | 3/16–1 | 0.12 | 1.94 | 41.9 | 30 | Somewhat easier to separate than No. 3. |
| 5 | 110 | 32.8 | 38.9 | 25 | 3/16–3/8 | 0.18 | 1.96 | 39.8 | 20 | Pellets not separable. |
| 6 | 124 | 33.9 | 42.8 | 25 | — | 0.18 | 1.94 | 39.3 | 40 | Pellets separable with slight difficulty. |
| 7 | 127 | 33.9 | 45 | 14 | — | 0.12 | 1.99 | 40.3 | 40 | Pellets separable with great difficulty. |

(1) Melt Flow Rate, ASTM Method D-1238-65T, Condition B.
(2) Sufficient pellets were taken to press a 1/8 in. × 6 in. × 6 in. sheet. The sheet was cut into pieces and repressed two additional times. Resin thus homogenized was analyzed by saponification. Sample also used for sodium ion analysis.
(3) Atomic absorption.
(4) A 1-inch layer of pellets was placed in a 50 ml. beaker. A weight equivalent to 1 psi was placed on the layer of pellets. The assembly was left in an oven at 49° C for 24 hours. After cooling to room temperature, the samples were rated.
(5) Feedstock resin supplied in pellet form.
(6) Oval cross-section.

EXAMPLE 2

This example illustrates the surface-treatement of an extruded EVA copolymer strand, in the manner essentially as described in Example 1, except that the original copolymer contained somewhat less vinyl acetate (37.8% by weight), the base concentration in the treatment bath was higher (0.090 g/cc) and the contact times in the treatment bath were substantially longer (from 45 to 123 seconds). In addition, the compaction tests on the treated pellets were carried out at both 49° C and 60° C (Table III).

Again, as was observed in Example 1, the untreated pellets were seriously agglomerated at both test temperatures, but the treated pellets were substantially free-flowing at room temperature and after compaction at 49° C provided that the treatment contact time is above 75 seconds and the treatment temperature is 39°–45° C (Samples 8 and 9). However, at a compaction test temperature of 60° C these same treated pellets lack sufficient agglomeration resistance to be free-flowing.

In no case, as a result of the treatment, did the vinyl acetate content of the pellets fall below 36.5% by weight, corresponding to a loss of about 3.5% by weight of the total amount of vinyl acetate originally present. The melt flow rate of the resin was substantially unaffected by the treatment. Some build-up of yellow-orange color was noted in the pellets subject to the more drastic treatments. In most cases the most serious agglomeration can be related to end-to-end and side-to-end sticking of the untreated cut ends of the pellets.

TABLE III
CONTINUOUS SURFACE TREATMENT OF ETHYLENE-VINYL ACETATE COPOLYMER STRAND

Treatment Bath: 95% Ethanol
Base: NaOH, 0.090 g/cc (Initial); 0.092 g/cc (Final)

| Sample No. | Extruder Stock Temp., °C | Surface Treatment Conditions Bath Temp., °C In | Surface Treatment Conditions Bath Temp., °C Out | Contact Time, Sec. | Pellet Cut | MFR g/10 Min. (1) | Vinyl Acetate Content, Wt. % (2) | Compaction Tests (3) At 49° C, 1 psi 24 hours | Compaction Tests (3) At 60° C, 1 psi, 24 hours |
|---|---|---|---|---|---|---|---|---|---|
| Untreated Control | — | — | — | — | Round | 14 | 37.83 | Pellets stuck together, compacted, separate with great difficulty. | Pellets stuck together, deformed, cannot remove from beaker. |
| 1 | 88 | 24 | 27 | 87 | Short | 12 | 37.21 | Pellets stuck together, separate with difficulty. | Almost impossible to separate pellets; little better than control. |
| 2 | 88 | 24.5 | 31.5 | 87 | Short | 13 | 37.11 | A little easier to separate than No. 1. | Similar to No. 1. |
| 3 | 88 | 29.5 | 37 | 68 | Short | 13 | 36.99 | Easier to separate than No. 1 or No. 2. | Pellets flattened, stuck together. |
| 4 | 88 | 34 | 40 | 45 | Long, Thin | 12 | 37.57 | More tightly stuck together than Nos. 2,3, less than No. 1. | Pellets tightly stuck together. |
| 5 | 88 | 36 | 40 | 91 | Medium | 12 | 36.80 | Less tightly stuck than Nos. 2,3. | " |
| 6 | 88 | 37 | 40.5 | 123 | Very Short | 13 | 37.32 | More sticky than No. 5; come apart with little difficulty. | " |
| 7 | 110 | 42.5 | 44 | 114 | Medium | 13 | 36.50 | Less sticky than No. 6. | Pellets separate with great difficulty |
| 8 | 104 | 39 | 45.5 | 75 | Long, Thin | 13 | 36.61 | Less sticky than No. 7, easy to loosen pellets. | Easier to separate than No. 7; harder than No. 9. |
| 9 | 132 | 42.5 | 45 | 100 | Medium | 13 | 36.80 | Less sticky than Nos. 7,8 free-flowing upon rapping beaker. (4). | Top and bottom pellets stuck pellets in center separate with difficulty. |

(1) Melt Flow Rate, ASTM Method D-1238-65T, Condition E.
(2) See Footnote No. 2, Table II.
(3) See Footnote No. 4, Table II.
(4) Similar test at 49° C, 24 hours, 2.6 psi, gave free-flowing pellets.

In the second embodiment of the invention, the EVA resin containing 35 to 60%, preferably 38 to 55% by weight of VA is pelletized in the conventional manner, e.g., by strand-chopping or in a fly-knife cutter bath using water as a coolant. The pellets are thereaftr treated in a separate operation as individual pellets.

This embodiment is illustrated in Examples 3-5, the treatment media containing ethanol and water or methanol and water, and being of the type classified as medium I and medium II in Table I. Although the contact times in this embodiment may be as brief as those in the first embodiment of this invention, it is often more convenient to employ somewhat longer contact times of up to 40 minutes or longer, provided no more than about 10% of the VA units are hydrolyzed.

EXAMPLE 3

This example illustrates the surface treatment of preformed pellets of an EVA copolymer in basic media comprising aqueous ethanolic solutions. Thus, in Experiments 1-3 of Table IV it can be seen that in a 95% ethanol containing about 1.2% by weight of sodium hydroxide, the pellets are rendered agglomeration-resistant after 30 minutes at 45° C, but not after 2 minutes at the same temperature, whereas if the concentration of the base is increased to 10.8% by weight (Experiment 4) a contact time of 0.5 minute suffices.

When potassium hydroxide is employed as the base in a 95% ethanolic medium, at a concentration of 19.5% by weight (Experiments 5-6), a contact time of 1 minute is sufficient to render the pellets agglomeration-resistant at 45° C. Substitution of the 95% ethanolic medium with a 1:1 volume mixture of 95% ethanol and water, i.e., with the liquid mixture characteristic of medium II (Experiments 8-10), however, reduced the activity of the bath to the point where no agglomeration resistance was observed even after 2 minutes at 45° C (base concentration equals 25% by weight). As will be shown in Example 4, a considerably higher base concentration is employed for medium II, preferably from about 35 to about 50 percent by weight.

TABLE IV
SURFACE TREATMENT OF PREFORMED ETHYLENE-VINYL ACETATE COPOLYMER PELLETS IN BASIC ETHANOLIC MEDIA AT 45° C
Copolymer Composition: 40.77; 41.68 weight percent vinyl acetate (1)
Weight of Pellets per Experiment: 10 g.

| Experiment No | Base Formula | g. | Ethanol, ml. (2) | Water, ml. | Treatment Contact Time, Min. | Nature of Treated Pellets |
|---|---|---|---|---|---|---|
| 1 | NaOH | 0.5 | 50 | none | 0.5 | Sticky |
| 2 | NaOH | 0.5 | 50 | none | 2 | Sticky |
| 3 | NaOH | 0.5 | 50 | none | 30 | Free Flowing |
| 4 | NaOH | 5 | 50 | none | 0.5 | Free Flowing |
| 5 | KOH | 10 | 50 | none | 0.5 | Slightly Sticky |
| 6 | KOH | 10 | 50 | none | 1 | Free Flowing |
| 7 | KOH | 10 | 50 | none | 2 | Hard, Slightly Hazy |
| 8 | KOH | 15 | 25 | 25 | 0.5 | Sticky |
| 9 | KOH | 15 | 25 | 25 | 1 | Sticky |
| 10 | KOH | 15 | 25 | 25 | 2 | Sticky |

(1) Analyses by saponification on two different portions of the same lot of resin.
(2) 95% ethanol.

EXAMPLE IV

This example, which is similar to Example 3, illustrates the surface treatment preformed pellets of an EVA copolymer in basic media of the type of both medium I and II, comprising aqueous methanolic solutions (Table V). In Experiments 1-4 of Table V it is seen that in a substantially pure methanolic medium containing 13.2% by weight of sodium hydroxide (medium I), a treatment temperature of 45° C again suffices to render the pellets agglomeration-resistant with contact times of 0.5-1 minute, whereas a treatment temperature of 26° C provides only marginal results. In Experiments 10-11 it was found that the pellets become resistant to agglomeration after a 1 minute treatment in a type I methanolic medium containing potassium hydroxide (20% by weight) at both 27° C and 45° C.

Sodium methoxide in methanol (16% by weight), a type IA medium, is shown to render the pellets agglomeration-resistant in 0.5 minute at 25° C (Experiment 12) and in 0.25 minute at 47° C (Experiment 13) without appreciable decrease in the VA content of the pellets. As pointed out above, sodium methoxide is utilized in a type IA medium whose liquid component is substantially a pure alkanol. If the methanol is replaced with a 1:1 volume mixture of methanol and water (medium II) and the alkali is maintained at only about 11% by weight, no appreciable agglomeration resistance is imparted to the pellets even after 30 minutes at approximately the same temperature (Experiments 5-6). However, if the sodium hydroxide concentration in the same medium is increased until the solution contains 36% by weight of sodium hydroxide in a 1:1 by volume mixture of methanol and water (Experiments 7-9), agglomeration resistance is imparted to the pellets after a contact time of 1-2 minutes at 45°-48° C.

TABLE V
SURFACE TREATMENT OF PREFORMED ETHYLENE-VINYL ACETATE COPOLYMER PELLETS IN BASIC METHANOLIC MEDIA
Copolymer Composition: 40.77, 41.68 weight percent vinyl acetate (1)

| Experiment No. | Copolymer Pellets, g. | Medium Composition | | | Treatment Conditions | | Condition of Treated Pellets | |
|---|---|---|---|---|---|---|---|---|
| | | Base Formula | g. | Methanol, ml. | Water, ml. | Temp., ° C. | Contact Time, Min. | Residual Vinyl Acetate % (2) | Character of Surface |
| 1 | 10 | NaOH | 6.0 | 50 | None | 26 | 0.5 | — | Sticky |
| 2 | 10 | NaOH | 6.0 | 50 | None | 26 | 1 | — | Very slightly sticky |
| 3 | 10 | NaOH | 6.0 | 50 | None | 45 | 0.5 | — | Free Flowing |

TABLE V-continued
SURFACE TREATMENT OF PREFORMED ETHYLENE-VINYL ACETATE COPOLYMER PELLETS IN BASIC METHANOLIC MEDIA
Copolymer Composition: 40.77, 41.68 weight percent vinyl acetate (1)

| Experiment No. | Copolymer Pellets, g. | Medium Composition Base Formula | g. | Methanol, ml. | Water, ml. | Treatment Conditions Temp., °C. | Contact Time, Min. | Condition of Treated Pellets Residual Vinyl Acetate % (2) | Character of Surface |
|---|---|---|---|---|---|---|---|---|---|
| 4 | 10 | NaOH | 6.0 | 50 | None | 45 | 1 | — | Free Flowing |
| 5 | 10 | NaOH | 5.5 | 25 | 25 | 45–8 | 0.5 | — | Sticky |
| 6 | 10 | NaOH | 5.5 | 25 | 25 | 45–8 | 30 | — | Sticky |
| 7 | 10 | NaOH | 25 | 25 | 25 | 45–8 | 0.5 | — | Sticky |
| 8 | 10 | NaOH | 25 | 25 | 25 | 45–8 | 1 | — | Slightly sticky |
| 9 | 10 | NaOH | 25 | 25 | 25 | 45–8 | 2 | — | Free Flowing |
| 10 | 10 | KOH | 10 | 50 | None | 27 | 1 | — | Free Flowing |
| 11 | 10 | KOH | 10 | 50 | None | 45 | 1 | — | Free Flowing |
| 12 | 250 | NaOCH$_3$ | 187 (3) | 1250 | None | 25 | 0.5 | 41.62 | Free Flowing |
| 13 | 250 | NaOCH$_3$ | 187 (3) | 1250 | None | 47 | 0.25 | 40.90 | Free Flowing, harder than 12 |

(1) Analyses by saponification on two different portions of the same lot of resin.
(2) Analysis by saponification of pellet sample homogenized as described in Footnote 2, Table II.
(3) Made by dissolving 80 g of metallic sodium in the methanol.

EXAMPLE 5

TABLE VI
SURFACE TREATMENT AND COMPACTION TESTING OF PREFORMED ETHYLENE-VINYL ACETATE COPOLYMER PELLETS
Copolymer Composition: 40.77; 41.68 weight percent vinyl acetate (1)
Weight of Pellets per Experiment: 250 g.
Surface Treatment Temperature: 45° C.

| Experiment No. | Medium Composition NaOH, g. | Formula | Alcohol, ml. | Water, ml. | Treatment Time, min. | Vinyl Acetate Content of Treated Pellets, wt.% (3) | Compaction Tests (2) 49° C 24 hours 1 psi Appearance of pellets | Relative Rating | 2 psi Appearance of Pellets | Relative Rating |
|---|---|---|---|---|---|---|---|---|---|---|
| 1 | 625 | CH$_3$OH | 625 | 625 | 2 | 43 | Stuck together; some fused. | Intermediate | Tightly stuck together. | Intermediate |
| 2 | 625 | CH$_3$OH | 625 | 625 | 10 | 40 | Stuck together. | Worst | Very tightly stuck together. | Worst |
| 3 | 125 | C$_2$H$_5$OH (4) | 1250 | None | 0.5 | 38 | Slightly stuck together. | Best | Stuck together. | Best |

(1) Analyses by saponification on two different portions of the same lot of resin.
(2) Tested as described in Table II. Footnote No. 4.
(3) Infrared analysis calibrated by saponification.
(4) 95% ethanol.

This example provides test results obtained by scaling up to larger proportions in experiments based on what appeared to be the most promising results of Examples 3 and 4, as judged by whether the treated pellets were free-flowing at ambient conditions.

In this example, preformed pellets of the same EVA copolymer employed in the experiments of Examples 3 and 4 were surface treated in selected basic aqueous alcoholic medium of both Type I and Type II disclosed in Tables IV and V, and then tested for agglomeration resistance in accordance with the procedure described in Example 1.

When the pellets were surface treated in a 1:1:1 sodium hydroxide-methanol-water medium (a Type II medium), the compaction tests carried out at 49° C (120° F) for 24 hours and 2 psi load indicated that under these conditions none of the pellets were sufficiently agglomeration-resistant (Table VI) to pass the test, although they were free-flowing at ambient temperatures and had accordingly been given sufficient agglomeration resistance to permit such operations as transfer, blending and feeding to further processing operations in the free-flowing pellet form at room temperature. However, at a load of 1 psi, which corresponds to the pressure generated by a column of the resin 4 feet high, the pellets treated with the ethanolic medium (Table VI, Experiment 3) were only slightly stuck together.

In the third embodiment of the invention it is contemplated that the EVA resin containing 35–95%, preferably from about 38 to about 70 percent, by weight of VA will be pelletized in a fly-knife cutter bath which uses the basic liquid medium as a coolant. Pelletization and surface treatment occur in a single operation. Media I, IA, II, III or IV may be employed under appropriate operating conditions, as disclosed above, although a medium such as III or IV, which is high in alkali concentration, but low in alcohol concentration, is preferred.

The feasibility of this embodiment is illustrated in Examples 6–8; however, Examples 6 and 7 are laboratory examples in which a fly-knife cutter was not utilized, while Example 8 is directed to the use of a fly-knife cutter.

EXAMPLE 6

This example shows that substantial agglomeration resistance can be imparted to extruded strands of EVA copolymer by treatment with aqueous solutions of sodium hydroxide (Medium IV). The EVA copolymer used in this example contained about 43.5% by weight of VA. A portion of the copolymer was compression-molded into a sheet ⅛ inch thick, which was cut into pieces and fed into a melt indexer operating at 190° C.

Strands of the resin were extruded from the melt indexer (EVA stock temperature, 190° C) in sufficient these conditions when the basic liquid medium contains about 2.4% by weight of ethanol (Experiment 6).

TABLE VIII
SURFACE TREATMENT OF ETHYLENE-VINYL ACETATE PELLETS IN AQUEOUS SODIUM HYDROXIDE SOLUTION EFFECT OF AVOIDANCE OF PREMATURE PELLET CONTACT AND PRESENCE OF ETHANOL IN MEDIUM

Copolymer Composition 43.5 Weight Percent Vinyl Acetate
56.5 Weight Percent Ethylene

| Experiment No. | Medium Composition | | | Temp., °C. | Contact Time, Min. | Pellet Disposition | Condition of Pellet Surface after Treatment |
|---|---|---|---|---|---|---|---|
| | NaOH, wt.% | Water, wt.% | Other Liquid, wt.% | | | | |
| 1 | 50 | 50 | — | 45–8 | 1 | Loose | Sticky |
| 2 | 50 | 50 | — | 45–8 | 60 | Loose | Sticky |
| 3 | 50 | 50 | — | 80 | 1 | Loose | Pellets stick, agglomerate |
| 4 | 50 | 50 | — | 80 | 1 | Necklace (1) | Very slight sticking |
| 5 | 49.7 | 49.7 | ethanol, 0.65 | 80 | 1 | Necklace (1) | Very slight sticking |
| 6 | 48.7 | 48.9 | ethanol, 2.4 | 80 | 1 | Necklace (1) | No sticking |

(1) Individual pellets were strung on a wire, prior to immersion in medium, to prevent premature contact therebetween.

amounts, directly into beakers containing aqueous sodium hydroxide solutions of various concentrations at 50° C. After being treated for the selected contact times, the treated strands were removed, washed with water, air-dried, and evaluated by observing the extent to which they tended to stick together. The results of these experiments appear in Table VII.

From Table VIi it can be seen that the strand at an initial stock temperature of 190° C entering an aqueous medium at 50° C will require a sodium hydroxide content of about 15 weight percent or more for significant agglomeration resistance to be imparted at contact times of 5–15 seconds.

TABLE VII
SURFACE TREATMENT OF ETHYLENE-VINYL ACETATE COPOLYMER STRAND WITH AQUEOUS SODIUM HYDROXIDE SOLUTION

| Treatment Medium (at 50° C) (Base Concentration in % by Weight) | Contact Time Seconds | Nature of Surface of Treated Strand |
|---|---|---|
| None (Control) | — | Sticky |
| 50% Aqueous NaOH Solution | 10–15 | Does not stick to itself |
| 30% Aqueous NaOH Solution | 10 | Not sticky |
| 15% Aqueous NaOH Solution | 5 | Not sticky |
| 15% Aqueous NaOH Solution | 15 | Not sticky |
| 7.5% Aqueous NaOH Solution | 15 | Inferior to above |

EXAMPLE 7

This example shows that agglomeration resistance may be imparted to pellets of the EVA copolymer described in Example 6 by treatment in an aqueous sodium hydroxide solution at 80° C if the liquid medium also contains a minor proportion of alcohol, i.e., if the medium is a Type III medium as defined in Table I, and care is taken to prevent premature contact of the pellets before the surface treatment is accomplished. As indicated by Table VIII, the pellets are not rendered agglomeration-resistant by direct immersion in a 50% aqueous solution of sodium hydroxide at either 45° or 80° C; the pellets so treated (Experiments 1-3) stick and agglomerate upon contact with each other. If, however, the pellets are strung on a wire (Experiment 4) so that premature contact is avoided, substantial agglomeration resistance is imparted, and the treated pellets stick together only slightly after a contact time of 1 minute at 80° C. Addition of ethanol to the bath in small amounts (Experiments 5 and 6), to provide a Type III medium, has a still more favorable effect; thus, the pellets are rendered substantially agglomeration-resistant under

EXAMPLE 8

This example illustrates the third embodiment of the invention in which an EVA copolymer is pelletized in a fly-knife cutter bath in a basic liquid Type III medium under conditions such that the pellets produced are rendered agglomeration-resistant. Thus, an EVA copolymer containing about 50% by weight of VA and at a stock temperature of 125° C is pelletized in a fly-knife cutter bath in which the cooling water is replaced with a basic liquid medium comprising a solution that contains 50% by weight of sodium hydroxide in a liquid mixture containing 5 volume % of methanol and 95 volume % of water. The solution is circulated through the fly-knife cutter bath. By means of a suitable heat exchanger the temperature of the circulating solution is so regulated that it enters the bath at about 20° C and leaves at a temperature of about 90° C (average: 55° C). The contact time of the resin in the fly-knife cutter bath is about 60 seconds. Pellets emerging from the bath are sprayed with water and dried by means of an air-knife. The pellets show substantially no tendency to agglomerate, whereas untreated pellets made in a similar manner readily agglomerate.

When EVA copolymers which are not normally pelletizable by conventional methods, i.e., those containing more than about 60% by weight of VA, are treated in the third embodiment of the invention, they acquire agglomeration-resistance and are made pelletizable by hydrolytic surface treatment. In accordance herewith it has been found that such copolymers, which are generally recognized as being unpelletizable by virtue of their extreme tendency to coalesce when in the particulate form, may in fact be pelletized if the pellets thereof are rapidly surface treated with the basic liquid media in accordance with this invention, before the coalescence can occur. The simultaneous pelletization-surface treatment operation occurs in a fly-knife cutter bath, as in the third embodiment.

The feasibility of this embodiment is illustrated in Examples 9 and 10, Example 9 being a laboratory scale example and Example 10 being a large scale example of the process.

EXAMPLE 9

In this example the EVA resin employed had a melt flow rate of 50 g/10 min. (Condition B) and contained 68.69% by weight of VA as determined by saponification. The resin was supplied as a single, colorless transparent mass which eventually takes the shape of its container as a consequence of its cold flow at ambient temperatures. For the purposes of the laboratory experiments described below, however, the resin was cut into small cubes (about 7 mm on each edge) which were approximately the size of the pellets that would be produced in a conventinal fly-knife cutter bath. These cubes tended to adhere to each other on contact, but were kept separated until their introduction into the basic liquid media used to impart agglomeration resistance, as described below.

EXAMPLE 9A (Treatment: 5 min. at 40° C)

To 200 ml of a basic liquid medium at 40° C, prepared by dissolving 125 g of sodium hydroxide in 1250 ml of 95% ethanol (medium I) contained in a stainless steel beaker equipped with a motor-driven paddle stirrer, there was added, over a period of 90 seconds, 112 g of the cubed EVA copolymer described above. After stirring for 5 minutes at 40° C, the basic liquid medium was decanted and the cubes were quenched with 3% aqueous acetic acid solution, washed twice with water, and air dried. Thus, there was obtained 108.5 g of single cubes with a slightly pinkish-white opaque shell. The cubes remained free-flowing at room temperature. Upon drying in vacuum overnight at about 50° C, however, tiny droplets of tacky material had exuded through the shell and eventually caused partial agglomeration of the cubes. A sample of the treated cubes (3-dozen cubes) was homogenized by compression molding three times at about 150° C. The final compression molded sheet was slightly hazy and tacky; it contained 67.25% by weight of VA, as determined by saponification.

EXAMPLE 9B (Treatment: 20 minutes at 50° C)

Example 9A was repeated exactly except that the treatment temperatures were raised to 50° C and the time was extended to 20 minutes. The recovered cubes (108.2 g) resembled those of Example 9A. After drying in vacuum overnight the exudation and accompanying agglomeration that occurred was less than in Example 9A, above. A homogenized specimen of the treated cubes contained 67.42% by weight of VA.

EXAMPLE 10

This example is also illustrative of the third embodiment of the invention. As described in Example 9, an EVA copolymer containing about 70% by weight of VA is synthesized at a temperature of about 220°–270° C at a pressure of about 1340–2340 atm., devolatilized to remove residual monomers, and extruded at an EVA stock temperature of 135° C into a fly-knife cutter bath containing a basic liquid medium (medium I) containing about a 10% by weight solution of sodium hydroxide in a methanol-water mixture containing about 97 volume % of methanol. A 2-minute treatment at an average bath temperature of about 55° C in the basic liquid medium produces pellets that are substantially resistant to agglomeration for a period of several hours. The treated copolymer pellets contain about 68% by weight of VA. When the same resin is pelletized in a fly-knife cuter bath containing water alone, the obtained pellets readily coalesce, and pelletization under these conditions, without surface treatment, is unsuccessful.

The fourth embodiment of the invention is directed to the simultaneous deagglomeration and surface treatment with basic media (to prevent reagglomeration) of agglomerated EVA pellets containing 35 to 60%, preferably 40–55%, by weight of VA. This embodiment is illustrated in Examples 11–13.

EXAMPLE 11

In this example, agglomerates of EVA copolymer pellets are deagglomerated to produce the original pellets, which are recovered in an agglomeration-resistant condition.

The EVA copolymer used in this example contained 46.75 and 46.59% by weight of VA as determined by analysis of duplicate examples of saponification. The copolymer resin was first pelletized in the conventional manner in a fly-knife cutter bath. The pellets agglomerated on storage at ambient temperature and under the pressure generated by their own weight in the container. The particular container of resin used in this example was made up of irregularly shaped agglomerates with dimensions that ranged from about 2 inches × 3 inches × 4 inches to as much as 4 inches × 5 inches × 7 inches and larger. The individual pellets comprising these agglomerates were about 8–10 mm in diameter and 10–12 mm in length. In the deagglomeration and surface-treating experiment described below, the larger agglomerates were manually broken up until all the agglomerates were of fairly uniform size, i.e., about 2–3 inches in width to 4–5 inches in length.

In a 3-liter stainless steel beaker fitted with a mechanical stirrer a solution of 125 g of sodium hydroxide in 1250 ml of 95% ethanol (medium I) was placed. To the stirred solution at 45° C, 900 g of the above-described, relatively uniform pellet agglomerates was added. The addition of the agglomerated pellets cooled the treating solution to about 40° C. The agglomerates were stirred for 5 minutes at 40° C, during which time they broke down substantially to regenerate the original pellets. The basic liquid medium was separated from the pellets by decantation and the regenerated pellets were then allowed to stand in about 1300 ml of 3% aqueous acetic acid for 5 minutes at 30° C. The pellets were recovered by filtration, washed with two 1200 ml portions of water and air dried. The dry pellets were free-flowing and were substantially colorless (Product I; Table IX).

The above procedure was repeated exactly to give Product 2, free-flowing, substantially colorless pellets. Thereupon the same basic liquid medium was reused to treat an additional 900 g of pellet agglomerates to provide Product 3, also comprising free-flowing, substantially colorless pellets (Product 3).

The above procedure was again repeated, but this time at a treatment temperature about 5° C higher than that used in the previous three experiments. The basic liquid medium was heated to 50°–51° C before adding the pellet agglomerates. The addition of the resin reduced the temperature of the medium to 45°–47° C. After 5 minutes of treatment at 45°–47° C with stirring, the pellets were recovered as described above (Product 4). The recovered pellets were white and opaque in appearance and where free-flowing. The once used basic liquid medium was then reused to treat another 900 g of agglomerated pellets in the same manner (5 minutes at 45°–47° C). The recovered pellets (Product 5) were pale tan and were free-flowing.

The five above-described deagglomerated pellet samples were subjected to sieve analysis to determine their size distribution. The results appear in Table IX. About 93% or more of the products consisted on the fraction collected on a No. 4 screen (U.S. standard sieve series). This fraction is substantially (94%) made up of the original, single pellets making up the agglomerated resin. About 6% of the No. 4 fraction is made up of double pellet agglomerates. The 0.5 inch screen collected about 5% of larger agglomerates (4-8 pellets each), and about 2% of smaller than normal pellets were collected on the No. 5 screen (Product 5; Table IX).

motor driven paddle stirrer. The breaker was kept on a hot plate and the temperature of the treatment solution was adjusted to 45° C, whereupon 907 g of the above-described pieces of agglomerated pellets were added thereto, with stirring, over a period of 45-60 seconds. Addition of the resin cooled in the treatment solution to 40°-41° C. The mixture was stirred for an additional 5 minutes at 40°-41° C. The treatment solution was decanted, and to the deagglomerated, surface treated pellets were added, at once, 1250 ml of 3% aqueous acetic acid solution, after which the resulting suspension was stirred for 5 minutes at about 30° C. The pellets were

TABLE IX

SCREEN ANALYSIS OF DEAGGLOMERATED ETHYLENE-VINYL ACETATE COPOLYMER PELLETS

Untreated Copolymer: 46.75; 46.59 weight percent vinyl acetate by saponification

| Product | | | SIEVE ANALYSIS | | | | | | | | |
|---|---|---|---|---|---|---|---|---|---|---|---|
| | Wt.% | | Amount on Screen No. [2] | | | | | | | | |
| No. | Vinyl Acetate [1] | Amount Taken g. | (A) (0.5 in.) g. | % | (4) (0.187 in.) g. | % | (5) (0.157 in.) g. | % | (6) (0.132 in.) g. | % | (7) (0.111 in.) g. | % |
| 1 | 46.13 | 889.4 | 39.4 | 4.4 | 840.0 | 94.4 | 9.7 | 1.1 | 0.2 | 0.02 | 0 | 0 |
| 2 | 45.66 | 890.0 | 40.5 | 4.5 | 844.0 | 94.8 | 4.1 | 0.46 | 1.1 | 0.12 | 0 | 0 |
| 3 | 45.65 | 898.0 | 14.9 | 1.6 | 871.0 | 97.0 | 10.0 | 1.1 | 2.5 | 0.28 | 0 | 0 |
| 4 | 45.20 | — | — | — | — | — | — | — | — | — | — | — |
| 5 | 44.77 | 874.1 | 42.9 [3] | 4.9 | 815.7 [4] | 93.3 | 15.5 [5] | 1.8 | 0 | 0 | 0 | 0 |

[1] A number of pellets were homogenized by repeated compression molding prior to saponification.
[2] U.S. Standard Sieve Series, except (A) which was a special screen.
[3] Agglomerates of 4-8 pellets each.
[4] Consisted of 770.2 g. (94.4%) of single pellets and 45.5 g. (5.6%) of double pellets.
[5] All small single pellets.

EXAMPLE 12

This example describes the deagglomeration and surface treatment of agglomerated pellets of an EVA copolymer containing 48.35% by weight of VA (determined by saponification) and having a melt flow rate of about 2-4 g/10 min. (Condition B). A 50-lb. supply of the pelletized resin was received in a 15 × 15 × 16 in. cardboard box and the pellets were agglomerated into a semi-continuous mass. Pieces of agglomerated pellets about 2-3 in. were broken off the agglomerated mass in the box and were fed into the deagglomeration, surface treatment experiment described below.

The treatment solution was prepared by dissolving 125 g of sodium hydroxide pellets in 1250 ml of 95% ethanol at 65° C. The thus prepared Type I medium was transferred to a 3-liter stainless steel beaker fitted with a washed twice with 1200 ml portions of water, and air-dried overnight to yield 905.9 g of free-flowing, white translucent pellets.

The entire amount of the deagglomerated, surface treated pellets were then classified by sieve analysis (Table X), and it was found that about 73% by weight of the agglomerated resin had been converted to single-pellet (9.9 × 7.2 mm) material, with another 12% by weight being recovered as small agglomerates containing 2-3 pellets each. The resin contained about 15% by weight of under-sized pellets (8.4 × 4.4 mm); nearly all of this was recovered in the form of agglomerates containing 8-20 small pellets each. A homogenized sample of the principal single pellet fraction contained 45.83% by weight of VA (determined by saponification).

TABLE X

SIEVE ANALYSIS OF DEAGGLOMERATED, SURFACE TREATED PELLETS OF AN ETHYLENE-VINYL ACETATE COPOLYMER CONTAINING 48.45 WEIGHT PERCENT VINYL ACETATE

Total Resin Charge: 905.9 g. agglomerated pellets

| Screen No. (Opening, in.) | Wt. Retained g | % | Remarks |
|---|---|---|---|
| A (1) (0.5 in.) | 136.6 | 15.1 | Cluster of 8-20 pellets each; the pellets being mainly those which pass through Screen No. 5 |
| 4 (0.187 in.) | 106.0 | 11.7 | 2-3 pellet agglomerates (2); the individual pellets being mainly those which pass through Screen No. 4 and are retained by Screen No. 5. |
| 4 (0.187 in.) | 663.2 | 73.2 | All single pellets (9.9 × 7.2 mm) (2). |
| 5 (0.157 in.) | 0.1 | 0.01 | All small single pellets (8.4 × 4.4 mm) |
| 6 (0.132 in.) | 0 | 0 | — |
| 7 (0.111 in.) | 0 | 0 | — |
| Total | 905.9 g | — | — |

(1) A special screen with 0.5 in. openings; other screens were U.S. Standard Sieve Series.
(2) This fraction was separated manually from single pellet fraction.
(3) 36 pellets were homogenized by compression molding 3 times at 150° C prior to saponification. The final sheet was slightly hazy. It contained 45.83% by weight of VA.

EXAMPLE 13

This example is a further illustration of the fourth embodiment of the invention. The experiments described in this example demonstrate the increased agitation during the treatment has a beneficial effect on the deagglomeration of the more severely agglomerated EVA copolymers. The EVA copolymer employed in this example had a melt flow rate of about 3–4 g/10 min. (Condition B) and contained 53.73% by weight of Va. A 50-pound supply of the resin was received in a 15 × 15 × 16 inch box. The pellets were agglomerated into a single, coherent mass which filled most of the box, yet the individual pellets themselves were distinctly discernible. Individual pellets could be torn by hand from the agglomerated mass, but, in so doing, they were usually deformed or broken. It appeared that the adhesive forces holding the pellets together were commensurate with the cohesive forces wthin the individual pellets.

EXAMPLE 13A

A 190 g charge of the above agglomerated pellets, previously cut into pieces 2–3 inches in diameter, was added to a basic liquid medium made by dissolving 125 g sodium hydroxide in 1250 ml of 95% ethanol (Type I medium) contained in a 3-liter stainless steel beaker stirred with a motor driven paddle stirrer. After stirring for 5 minutes at 40° C, the partially deagglomerated pellet mass was quenched with 3% aqueous acetic acid, washed with water, air dried, and classified as to size (Table XI).

From Table XI it is clear that the deagglomeration of agglomerated pellets of this particular resin, employing the motor driven paddle stirrer-type of agitation that had been successful in the previous deagglomeration example was unsuccessful; more than 80% by weight of the product was recovered in the form of agglomeration containingmany pellets each.

TABLE XI
SIEVE ANALYSIS OF DEAGGLOMERATED, SURFACE TREATED PELLETS OF AN ETHYLENE-VINYL ACETATE COPOLYMER CONTAINING 53.73 WEIGHT PERCENT VINYL ACETATE

| Screen No. (1) (Opening, in.) | Agitation: Paddle Stirrer Fraction Retained | | Remarks |
|---|---|---|---|
| | g. | % | |
| 1 (1 in.) | 158.2 | 83.3 | Large agglomerates containing many pellets each. |
| A (0.5 in.) | 21.1 | 11.1 | Agglomerates containing 7-12 pellets each. |
| 4 (0.187 in.) | 3.4 | 1.8 | Two-pellet agglomerates (2) |
| 4 (0.187 in.) | 7.3 | 3.8 | Single pellets (3) |
| 5 (0.157 in.) | 0 | 0 | — |
| 6 (0.132 in.) | 0 | 0 | — |
| Total | 190.0 | — | — |

(1) U.S. Standard Series; Screen A was a special screen.
(2) Double pellets separated manually from single pellets.
(3) Average pellet size (treated pellets): 11.9 × 8 mm.

EXAMPLE 13B

In this experiment it is demonstrated that the agglomerated pellets of this example can be successfully deagglomerated and surface-treated, using substantially the same basic liquid treating bath employed in Example 13A, if the operation is carried out under conditions of more intense agitation, such as that provided by a Waring Blender (Model 700B, 1-quart capacity).

The agglomerated pellets were treated in the Waring Blender with the usual basic liquid medium. A single agglomerate mass (112.5 g) was added to 200 ml of a basic liquid medium that had been prepared by dissolving 125 g of sodium hydroxide in 1250 ml of ethanol. The resin and basic liquid medium were blended for 5 minutes at 40° C. The liquid was decanted, and the deagglomerated pellets were quenched in 200 ml of 3% aqueous acetic acid solution at room temperature. The pellets were air dried for 1 hour and were recovered as white, slightly rough, free-flowing pellets. Sieve analysis of the entire product indicated that it was almost entirely made up of individual pellets (Table XII).

TABLE XII
SIEVE ANALYSIS OF DEAGGLOMERATED, SURFACE TREATED PELLETS OF AN ETHYLENE-VINYL ACETATE COPOLYMER CONTAINING 53.73 WEIGHT PERCENT VINYL ACETATE

| Screen No. (1) (Opening, in.) | Agitation: Waring Blender (5 minutes) Fraction Retained | | Remarks |
|---|---|---|---|
| | g | % | |
| A (0.5) | 0.0 | 0.0 | — |
| 4 (0.187) | 109.6 | 99.6 | All single pellets (2) with shell-like, white surfaces. |
| 5 (0.157) | 0.4 | 0.36 | Four small pieces of pellet. |
| 6 (0.132) | 0 | 0 | No other fines. |

(1) U.S. Standard Sieve Series; Screen A was a special screen.
(2) Single pellet size (treated pellets): 12.3 × 7.5 mm. About 3 dozen pellets were compression molded three times. The final sheet contained 51.23 weight percent vinyl acetate by saponification.

EXAMPLE 13C

In this experiment it is shown that the slightly rough surface of the single pellets recovered in Example 13B, which, is attributable to the action of the sharp blades of the blender, can be substantially reduced by limiting the dwell time in the blender to 2 minutes, and completing the treatment by stirring with a paddle stirrer.

In a manner similar to that described in Example 13B, 113.5 g of the Eva copolymer in the form of agglomerated pellets were blended for 2 minutes at 40° C in 200 ml of the basic liquid medium (126 g NaOH in 1250 ml of 95% ethanol). After this treatment the pellets appeared to be substantially deagglomerated and fairly smooth. The treatment was continued for 3 minutes in a vessel stirred with a paddle stirrer, and the pellets were recovered by quenching in 3% acetic acid solution and air-drying; 113.5 g of hazy, translucent, smooth pellets were obtained. The sieve analysis of these pellets appears in Table XIII. The single pellet fraction is somewhat lower (94%), as compared to Example 13B, but the pellets were much smoother, a fact which can evidently be attributed to the shorter time the pellets spent in the blender.

TABLE XIII

SIEVE ANALYSIS OF DEAGGLOMERATED, SURFACE TREATED PELLETS ON AN ETHYLENE-VINYL ACETATE COPOLYMER CONTAINING 53.73 WEIGHT PERCENT VINYL ACETATE

Agitation: Waring Blender (2 minutes)
Paddle Stirrer (3 minutes)

| Screen No. (1) (Opening, in.) | Fraction Retained g | 1% | Remarks |
|---|---|---|---|
| A (0.5) | 8.6 | 7.6 | Agglomerates of 3–8 pellets each |
| 4 (0.187) | 10.8 | 9.5 | Two-pellet agglomerates (2). |
| 4 (0.187) | 93.7 | 82.8 | Single pellets (3). |
| 5 (0.157) | 0 | 0 | No small pellets or pellet fragments. |
| 6 (0.132) | 0 | 0 | No other fines. |

(1) Sieve A was a special sieve; all others, U.S. sieve series.
(2) Free-flowing agglomerates, separated manually.
(3) Single pellets (12.3 × 7.5 mm) were free-flowing. About three dozen pellets homogenized by compression molding three times. Final molded sheet slightly hazy; 51.67% VA by saponification.

EXAMPLE 14

Example 14 is a laboratory experiment showing that treatment with an alcohol alone will not improve the agglomeration resitance of the pellets in the absence of a base.

In this example it is shown that ethanol alone, without a base and employing conventional stirring, is not sufficient to effect deagglomeration of, and impart resistance to reagglomeration of, pellets of the EVA copolymer of Example 11, which contains 46.75 and 46.59% by weight of VA (duplicate saponification determinations).

Into a 500 ml stainless steel beaker fitted with a motordriven paddle stirrer were added 125 ml of 95% ethanol. The ethanol was heated to 47° C with stirring and 87 g of the copolymer were added over a period of 30–40 seconds. The contents of the beaker were stirred at 45° C for 15 minutes. The ethanol was decanted and the copolymer was quenched with 3% aqueous acid solution. The copolymer was recovered as a single agglomerated mass.

While the invention has been described above in its several embodiments and in particular in the examples, these examples are not to be taken in any limiting sense and are merely illustrative of the invention which is defined by the claims.

Having thus described the present invention, what is desired to be secured by Letters Patent and what is claimed is:

1. A process for deagglomerating previously agglomerated mass of an ethylene-vinyl acetate copolymer comprising from 35 to 60% by weight of vinyl acetate, comprising:
   a. treating agglomerates of the copolymer while at a temperature of from 20° to 60° C, with an alkaline liquid medium incorporating from 3 to 60% by weight of an alkali metal hydroxide or alkali metal alkoxide in a diluent selected from the group consisting of water, a water-miscible lower alkanol and mixtures thereof, which medium does not dissolve the ethylene-vinyl acetate copolymer;
   b. maintaining the medium at a temperature of from 10° to 100° C in contact with the pellets while agitating the medium for a period of at least 5 seconds to at least partially hydrolyze the vinyl acetate groups on the surface of said copolymer but to hydrolyze no more than 10% by weight of the vinyl acetate groups originally present in the copolymer, to deagglomerate the copolymer;
   c. washing the deagglomerated, treated pellets with an aqueous wash medium to remove therefrom any residual alkali metal hydroxide or alkoxide; and
   d. drying the treated, agglomeration-resistant pellets thereby formed.

2. A process according to claim 1 wherein the alkaline liquid medium comprises 30 to 100% by weight of said lower alkanol.

* * * * *